(12) United States Patent
Perschon et al.

(10) Patent No.: US 8,541,698 B2
(45) Date of Patent: Sep. 24, 2013

(54) BASE PLATE WITH SEALING BLOCKS

(75) Inventors: Helmut Perschon, Berlin (DE); Günter Irmer, Berlin (DE)

(73) Assignee: Berthold Sichert GmbH, Berlin (DE)

( * ) Notice: Subject to any disclaimer, the term of this patent is extended or adjusted under 35 U.S.C. 154(b) by 342 days.

(21) Appl. No.: 12/921,040

(22) PCT Filed: Mar. 3, 2009

(86) PCT No.: PCT/EP2009/052492
§ 371 (c)(1),
(2), (4) Date: Nov. 30, 2010

(87) PCT Pub. No.: WO2009/109568
PCT Pub. Date: Sep. 11, 2009

(65) Prior Publication Data
US 2011/0080078 A1     Apr. 7, 2011

(30) Foreign Application Priority Data
Mar. 4, 2008  (DE) .......................... 10 2008 012 460

(51) Int. Cl.
*H02G 3/18* (2006.01)

(52) U.S. Cl.
USPC ................... 174/650; 174/153 G; 174/152 G; 174/659; 248/56; 248/68.1; 312/223.6

(58) Field of Classification Search
USPC ............. 174/480, 481, 50, 53, 57, 58, 152 G, 174/135, 153 G, 650, 152 R, 659, 663, 664; 220/3.2–3.9, 4.02; 248/56, 68.1; 385/135; 29/525.11, 426.2; 312/223.6, 326, 223.1, 312/223.2, 351.2
See application file for complete search history.

(56) References Cited

U.S. PATENT DOCUMENTS

| | | | |
|---|---|---|---|
| 4,702,444 A * | 10/1987 | Beele ............................. 248/56 |
| 4,919,372 A * | 4/1990 | Twist et al. .................... 248/56 |
| 5,202,538 A | 4/1993 | Skirpan |
| 6,265,670 B1 * | 7/2001 | Duesterhoeft et al. .... 174/152 G |
| 6,396,990 B1 * | 5/2002 | Ehn et al. ...................... 385/135 |
| 7,282,650 B2 * | 10/2007 | Czuhanich et al. ........... 174/650 |
| 7,330,628 B1 | 2/2008 | Kowalczyk et al. |
| 7,711,234 B2 | 5/2010 | Smith et al. |
| 7,751,179 B2 | 7/2010 | Irmer et al. |
| 8,051,614 B1 * | 11/2011 | Peck et al. .................... 174/481 |

(Continued)

FOREIGN PATENT DOCUMENTS

| | | |
|---|---|---|
| DE | 78 16 729 | 9/1978 |
| DE | 27 20 936 | 11/1978 |
| DE | 10 2006 033 302 | 2/2007 |
| EP | 1 376 795 | 1/2004 |

*Primary Examiner* — Angel R Estrada
(74) *Attorney, Agent, or Firm* — Head, Johnson & Kachigian, P.C.

(57) ABSTRACT

The invention relates to a base plate (2) in a cable distribution cabinet. The base plate (2) is divided into two. The rear half (2*a*) can be folded down and the other half (2*b*) can also be inserted from the direction of the lower base chamber (3). The base plate (2) is sealed from the cables (15) with the help of sealing blocks (5) of a closed-cell foam and not by means of rubber grommets. The sealing blocks (5) have a height of several centimeters and, with that, a high sealing length. Any shifting of the sealing blocks (5) is prevented by threading them on guide rods (14).

61 Claims, 7 Drawing Sheets

(56) References Cited

U.S. PATENT DOCUMENTS

2002/0079112 A1 6/2002 Clouet et al.
2008/0042535 A1 2/2008 Guzzo et al.
2008/0042536 A1 2/2008 Guzzo et al.

* cited by examiner

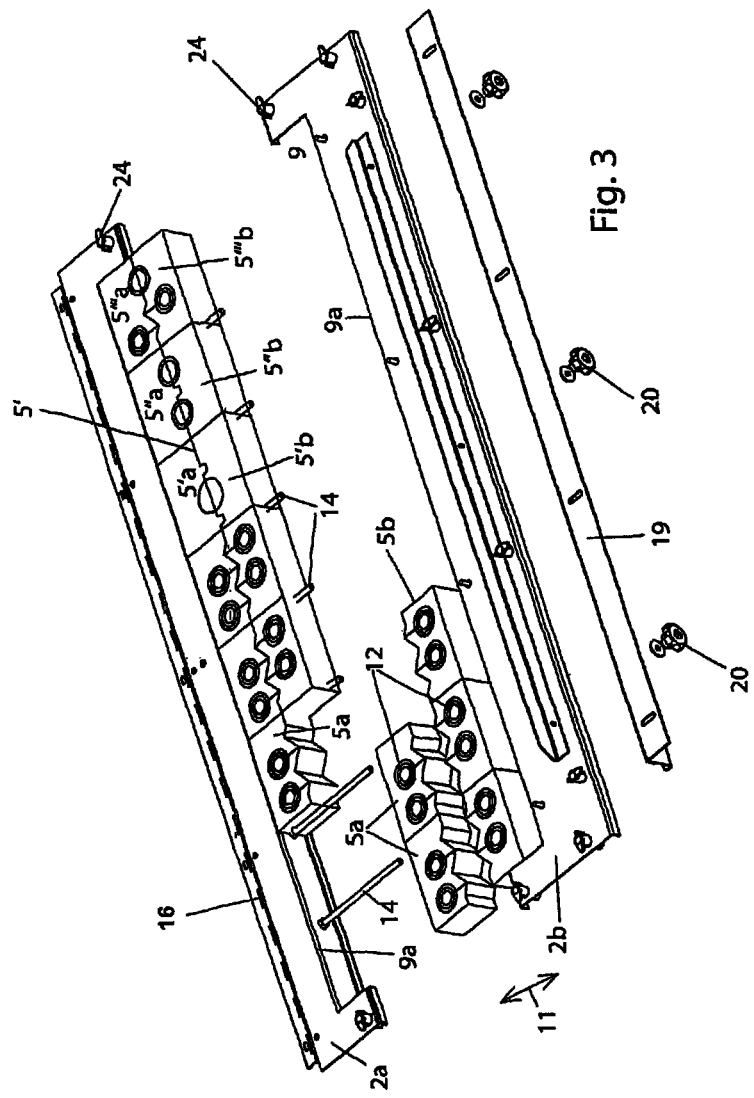

BASE PLATE WITH SEALING BLOCKS

This application is a National Stage Application of PCT/EP2009/052492, filed 3 Mar. 2009, which claims benefit of Serial No. 10 2008 012 460.5, filed 4 Mar. 2008 in Germany and which applications are incorporated herein by reference. To the extent appropriate, a claim of priority is made to each of the above disclosed applications.

TECHNICAL FIELD

The invention relates to a bottom plate, as is arranged in particular in cable distribution cabinets between the distribution compartment and the pedestal compartment as a partition, but can also be used in other electrical switchgear cabinets.

BACKGROUND

Cable distribution cabinets are used, for example, in telecommunications technology to connect a large number of domestic service connections to the underground cables.

For this purpose, the housing of the switchgear cabinet in which the distribution compartment with the clamping rails or further active electrical components is located, is positioned on a hollow pedestal, which extends at least partially into the ground and through which the underground cables are passed.

For reasons of protection against electric shock, the formation of condensation water etc., a bottom plate is arranged as a partition between the distribution compartment and the pedestal compartment, i.e. between the actual cabinet housing and the pedestal, and the underground cables extend upwards into the distribution compartment through said bottom plate.

A number of problem cases need to be taken into consideration here.

Firstly, when viewed in plan view, a fitting rack is usually fitted in the housing, and this fitting rack ensures the stability of the housing, and the individual components, in particular the blocks with the terminal strips, are screwed on the fitting rack.

When viewed in plan view, these blocks with terminal strips are located in the front region, approximately in the front half, of the basic outline of the housing. The underground cables should therefore pass through the bottom plate preferably in the rear region in order to be passed up from there behind the terminal strips to the required height.

Theoretically, the underground cables could also pass through the bottom plate in the front region, but in this case they would have to be bent back towards the rear below the lowermost terminal strip. As regards the thickness of the underground cables of usually more than 4 cm and the corresponding rigidity, this is in principle difficult, but is even more difficult, in view of the tight installation conditions, the further towards the bottom on the fitting rack the terminal strips begin because there is less space remaining for a deflection towards the rear between the cable passage in the bottom plate and the lowermost terminal rail.

Another problem is the damage to switchgear cabinets owing to motor vehicles being driven into them.

In this case, the outer protective paneling of the switchgear cabinet is often damaged, and this can be replaced relatively easily.

If, however, the frame and/or the bottom plate is also broken and needs to be replaced, the complexity involved is very great since the individual underground cables pass through this bottom plate through cable passages and therefore all of the underground cables need to be disconnected prior to the replacement and the switchgear cabinet needs to be lifted off from the pedestal before a new bottom plate can be fitted on the pedestal.

This also results in a long downtime of all of the domestic service connections suspended on this switchgear cabinet.

A further complicating factor is the fact that the housing usually comprises an inner frame, which is composed of profiles along the edges and onto which the outer paneling of the housing is applied, and this inner frame often reaches down beyond the boundary between the distribution compartment and the pedestal region and merely has horizontal transverse struts at the boundary, on which struts the bottom plate can be fastened.

SUMMARY

The object in accordance with the invention is therefore to provide a bottom plate which, despite simple and inexpensive manufacture with good utilization of the distribution compartment, allows a large number of cables to be passed through and can nevertheless be fitted simply and quickly even in the event of damage and extension.

As a result of the fact that the at least one plate part of the bottom plate is fastened on the outer edge of said bottom plate in such a way that it can be folded with respect to the frame, this half does not need to be completely removed, but can be brought out of engagement with the cables being passed upwards by means of being folded away.

In addition, this plate part can also be completely removed. For this purpose, either the hinge which enables the folding process is a disconnectable hinge, or the fastening of this plate part to the frame can be released.

The other plate part with respect to the foldable plate part is preferably only removed and is not configured so as to be foldable, but can alternatively likewise additionally be foldable.

An important factor here is the fact that the folding mechanism is designed in such a way that the foldable plate part can be folded away downwards into the pedestal region.

Even in the case of the other plate part which can be dismantled, the fastening together with the dimensioning of the plate part should be selected in such a way that this plate part is only removed downwards, into the pedestal region, during dismantling.

During the fitting and dismantling process, these plate parts thus do not need to enter the distribution compartment, i.e. the compartment above the bottom plate, and the internals provided there do not need to be deactivated or disconnected.

The fastening of the plate parts on the frame takes place by means of locking elements which are as simple as possible and as quick to operate as possible, in particular quick-release closures, such as quick-release lever-type closures, which only require a quarter rotation for locking.

In the central region of the bottom plate, an opening is provided which extends beyond the separating line between the two plate parts, through which the cables run upwards.

In this case, the moisture sealing against the ingress of moisture upwards into the distribution cabinet is avoided as a result of the fact that cable bushings made from rubber material in the form of thin flat material with a thickness of from 1 mm to 3 mm are not used, as is conventional, but the opening around the cables is closed with the aid of sealing blocks made from an elastic material, in particular foamed material, which have a sealing length, i.e. measured in the vertical cable running direction at this point, of at least 30 mm, preferably at least 50 mm, preferably at least 70 mm.

These sealing blocks preferably comprise a closed-cell foamed material, i.e. a foamed plastic, in order to prevent the ingress of water into the individual pores and the forced advancement on this path.

The cable passages are precut into the sealing blocks, but the parts falling out in the process which provide the cable passage are not completely removed, but the necessary ring-shaped cuts still have interruptions as the joints. In this way, primarily a plurality of concentric almost finished ring-shaped cuts for different cable diameters can be produced. During fitting, the required ring-shaped cut is then finished and the corresponding core element removed.

In this case, the ring-shaped cuts do not run vertically, i.e. at a right angle with respect to the upper side and lower side of the sealing block, but are slightly inclined with respect thereto and form a truncated cone, which has its smallest diameter at the upper end.

Since the material is elastic, even when a neck diameter at the upper end of the truncated cone is selected to be too narrow, the material there is expanded so far outwards by means of compression that it allows the cable to pass through and seals said cable off particularly well as a result of this prestress.

The moisture approaching from below will have to overcome an ever greater resistance as it rises further upwards as a result of this increasing prestress and will therefore ultimately not be able to pass into the distribution compartment. The cone angle is in this case between 1° and 10°, preferably between 2° and 7°.

The ring-shaped cuts additionally have an access cut, which reaches from the freely accessible edge of the sealing block up to the ring-shaped cut and along which the sealing block can be folded apart in order to be able to push it from the side onto the already fitted cable.

In order to further facilitate fitting, the sealing blocks are separated in the longitudinal direction and the cable passages are either accommodated completely in one of the two block parts—with an access cut towards the contact face to the other block part—or they lie centrally on the separating line, with the result that no access cut is required.

In each case one of the two associated halves of a sealing block then bears with its rear side facing away from the contact face against a longitudinal edge of the opening in the bottom plate, i.e. against one of the two plate parts.

In order to safely press the block parts against one another in the fitted state and also to avoid a lateral displacement, the separating line between the block parts is not a straight separating line, but has protrusions in one and/or another transverse direction, and the other block part has a corresponding cut-out. Preferably, the separating line has a zig-zag configuration when viewed in plan view, and the two block parts are preferably identical in terms of configuration.

In order that, in the fitted state, the two sealing blocks remain safely between the two halves of the bottom plate around the cables, they are plugged onto guide bars.

These guide bars run from the longitudinal edge of the opening on one plate part, in particular the foldable plate part, in the transverse direction into the opening, to be precise in the plate plane or slightly offset parallel with respect to the plate plane, and beyond the separating line and also beyond the opposite longitudinal edge of the opening, below the other plate part.

These guide bars are arranged distributed at regular intervals over the longitudinal extent, and corresponding through-openings running in the transverse direction for plugging-on as guide opening are arranged in the sealing blocks at an identical interval.

Preferably, in each case one guide opening is provided in each sealing block laterally close to the end. The length of the opening in the bottom plate is filled precisely by a specific number of sealing blocks, the intention being for the totality of the sealing blocks to have an overdimension in comparison with the opening in the bottom plate both in a longitudinal direction and in a transverse direction in order to achieve the desired prestress in the fitted state. The number of guide bars is therefore preferably double the number of sealing blocks.

In order to have secure bearing of the sealing blocks available in the transverse direction, the longitudinal edge of the opening is in each case in the form of a vertically running stop face on the plate parts, the height of said stop face corresponding at least to the height of the sealing blocks and preferably having a bend, which protrudes into the opening, for resting the ends of the sealing blocks at the lower end.

The guide bars are fitted at approximately half the height of this stop face.

In order to subject the sealing blocks sufficiently to prestress in the transverse direction, this is preferably not brought about by the use of the second plate part alone, but by a press strip, which can be prestressed in the transverse direction, presses against the longitudinal edge of the sealing blocks which faces the second plate part and extends over the entire length of the opening.

This press strip is fastened displaceably on the non-foldable plate part, in particular the front plate part, by means of longitudinal slots, and the free ends of the guide bars, on which an external thread is applied, pass though said press strip.

As a result, the press strip can be prestressed against the sealing blocks by means of threaded closures fitted on these free ends (behind the press strip).

With such a bottom plate, problem cases such as repair work and extensions of cable distribution cabinets can also be realized easily.

In the case of repair work, the supporting frame often also needs to be removed in addition to the outer housing, i.e. the cladding, owing to damage.

Since an already existing bottom plate, even if it is not itself damaged and does not itself need to be replaced, is fastened on the transverse struts of the frame, first this bottom plate needs to be removed before the frame is replaced. Then, the frame is detached from the pedestal and the internals or the mounting rack supporting said internals and lifted off upwards and a new frame is positioned.

Then, the undamaged old or replaced new bottom plate in the two-part foldable physical form according to the invention is fitted relatively easily by the rear, foldable plate part first being fastened on the frame in the as yet unclad pedestal region below the fitting plane of the bottom plate.

Then, the first, i.e. the rear row, of block parts is pushed onto the guide bars of the folded-down plate part over the entire length of the opening in this plate part onto the guide bars and, in advance, the corresponding cable passages in these sealing blocks are already opened corresponding to the diameter and the position of the cables extending upwards through the pedestal region.

Then, this plate part is folded up into the activated horizontal position and, in the process, the cables are introduced through the access cut into their respective cable passage of the corresponding block part, and the rear plate part is fixed in this folded-up position.

Now, the second, front halves of the block parts are pushed onto the guide bars of the rear plate part once, in turn, the cable passages for the cables which are further forward therein have been opened at the corresponding points and with the appropriate diameters, which cables in the process pass through the access cuts into their cable passages.

Then, the second plate part is brought from below through the pedestal region from the front against the block parts until it has been raised up as far as the fitting plane of the bottom plate, and is fixed with respect to the frame.

In order to press the sealing blocks tightly against the outer circumference of the cables, a press strip, which extends over the entire length of the opening and has a vertical limb which extends downwards from the front plate part, is pressed against the end face of the second row of blocks with the aid of the free end of the guide bars, which is passed through and is equipped with an outer thread, on which guide bars the rotary closures are fitted.

Usually even more complex than repair work is the extension of an existing cable distribution cabinet if further internals no longer have room in the previous cabinet.

Depending on the age of the cable distribution cabinet, the model in question is one with a frame supporting the housing, or else one without such a frame, in which only a mounting rack for supporting the internals is provided.

Likewise, a bottom plate may be provided in the existing cabinet, or not.

In any case, as was described above in relation to repair work, first the housing, i.e. the external cladding and possibly the internal frame, needs to be removed.

Since a relatively wide pedestal is also required for the extension work, i.e. generally widening work, on the housing, the pedestal also needs to be replaced.

In order that it is not necessary for the internals to be removed and disconnected, they need to be suspended on an auxiliary apparatus in order to remove the pedestal. Then, the supporting pedestal is removed and a new, wider pedestal is fitted underneath, on which the mounting rack can now rest.

Then, the new, wider frame is slipped over from above and fastened on the pedestal. The rack supporting the internals is then fastened on the new frame.

Now, the fitting of the bottom plate can be performed and, if another bottom plate was provided on the old rack which did not need to be removed in order to remove the old housing, the new plate is fitted below the level of the old bottom plate, as a result of which the new bottom plate also only needs to surround the cables running from the bottom upwards and not further vertical struts originating from the old cabinet.

Owing to the design and the fitting sequence of the bottom plate, as described above, this is also easily and quickly possible in the case of the widened cabinet as a result of the accessible pedestal region which is free apart from the cables.

BRIEF DESCRIPTION OF THE DRAWINGS

Embodiments in accordance with the invention are described in more detail by way of example below. In the figures:

FIG. 3 shows the bottom plate during assembly.

DETAILED DESCRIPTION

Figure 1A:
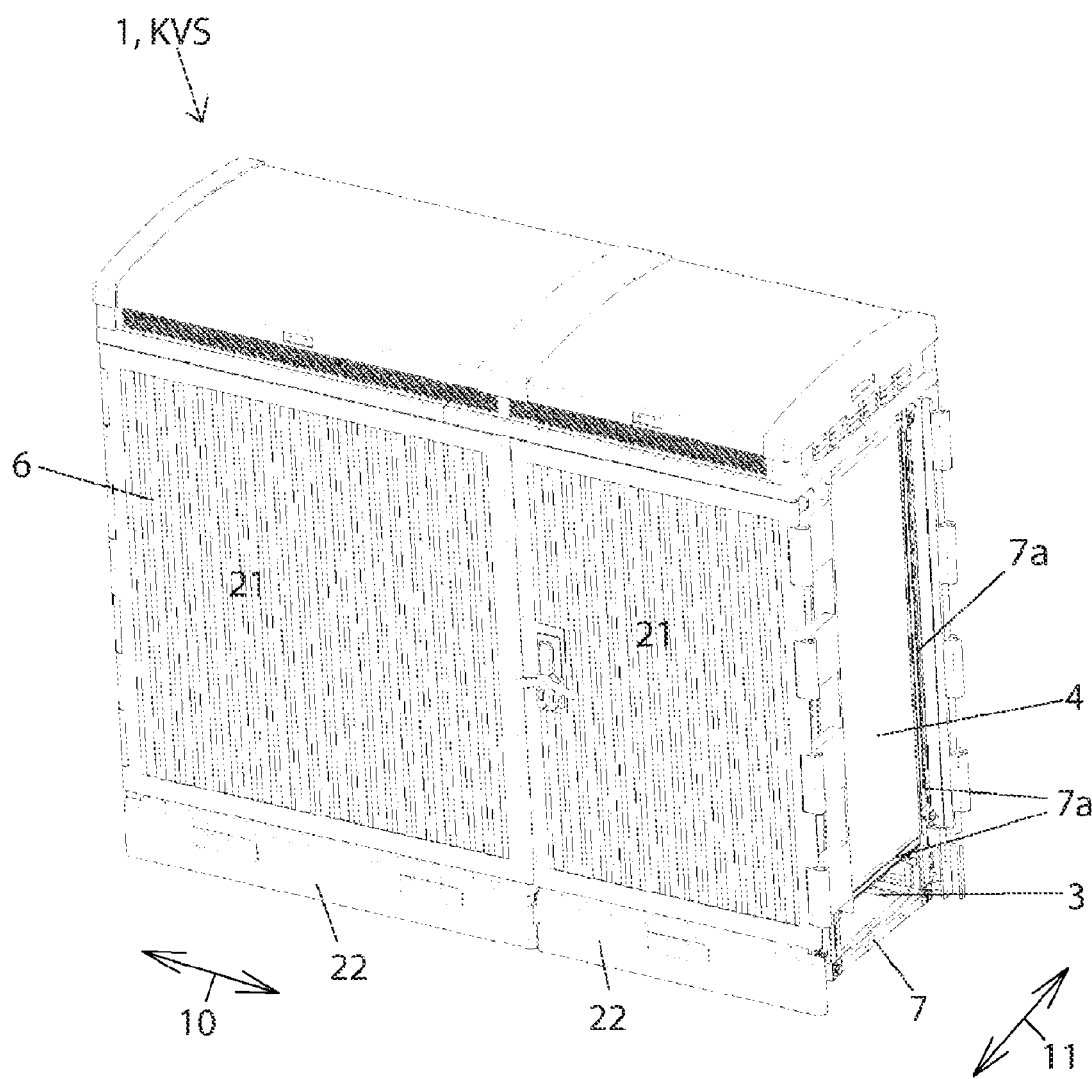
FIG. 1 shows a cable distribution cabinet (KVS)

FIG. 1 shows a switchgear cabinet 1 with a special physical shape of a cable distribution cabinet KVS, as is used in the public sector for accommodating domestic service connections for telecommunication lines and the like in large numbers.

In the cable distribution cabinet KVS, the outer protective cladding is removed on one of the end sides and the further cabinet module attached there is removed, while all of the rest is covered and protected in a conventional manner using flat elements made from plastic, i.e. roof elements, doors, pedestal cladding etc., which are fastened on an inner frame 7 comprising profiles along the longitudinal edges.

It can be seen on the open end side that this frame 7 has, at the height of the separation between the upper distribution compartment 4 and the lower pedestal region 3 of the interior of the cabinet, a transverse strut 7a. The frame 7 has such a horizontal strut in the longitudinal direction 10 as well, namely the greater extent of the cable distribution cabinet KVS when viewed in plan view.

While the distribution compartment 4 is accessible by opening the doors of the cabinet, the pedestal region 3 is accessible by removing the pedestal cover 22.

Figure 2:
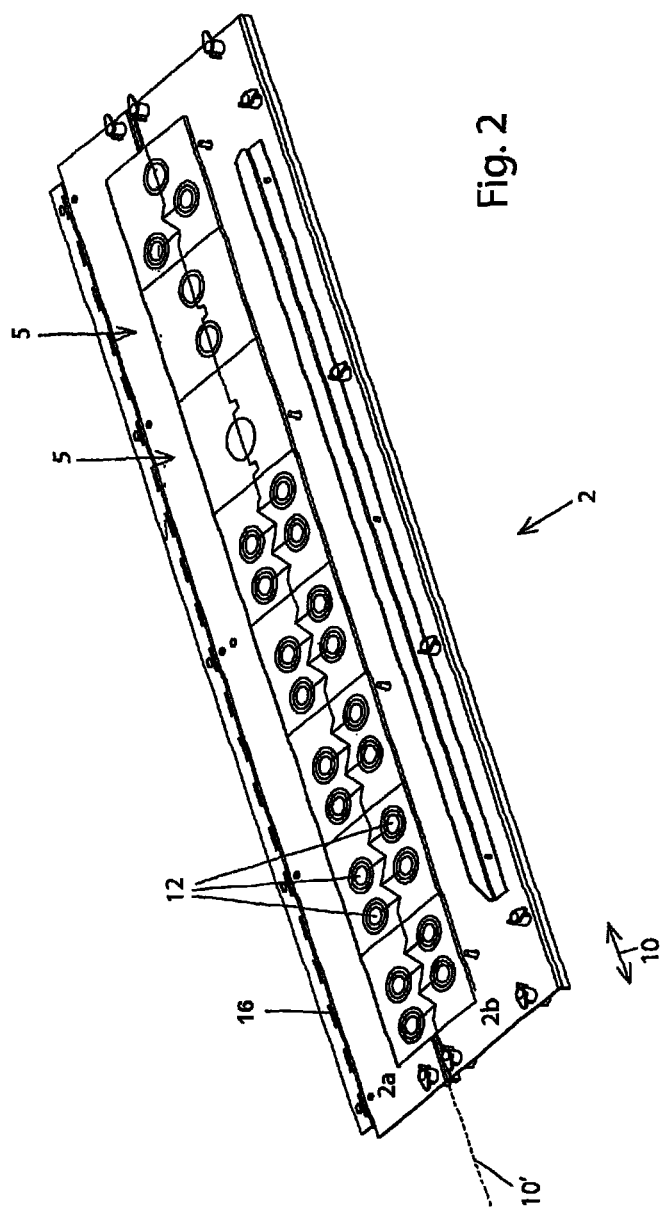
FIG. 2 shows the completely assembled bottom plate.

On the separating plane between the distribution compartment 4 and the pedestal region 3, a bottom plate 2 fitted there acts as a separation, which is fastened on the horizontal struts 7a, fitted at this height, of the frame 7 and is illustrated in FIGS. 2 and 3.

Figure 1B:
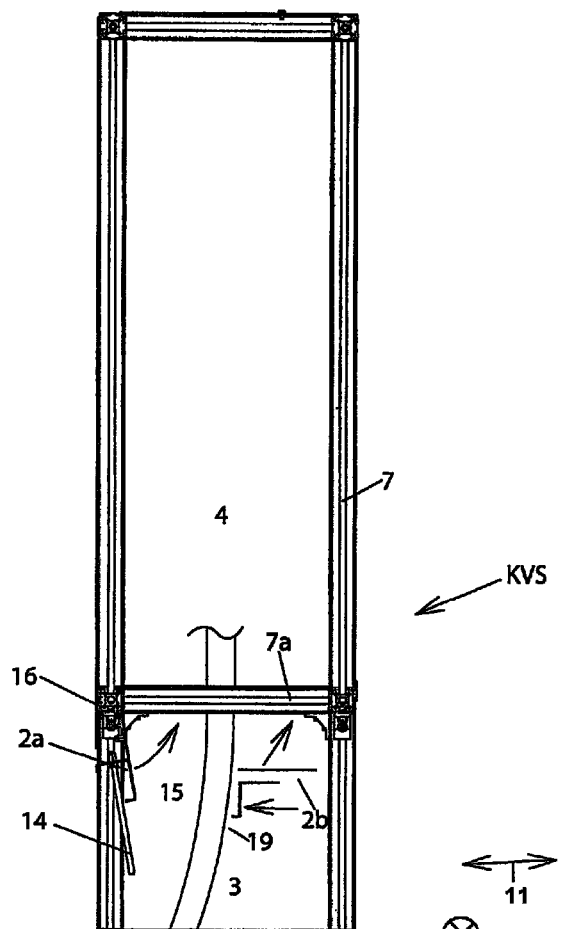

FIG. 1b shows the frame 7 of the cable distribution cabinet KVS at the beginning of the fitting of this bottom plate 2 when viewed in the longitudinal direction 10.

As can be seen, the problem consists in the fact that the in general plurality of cables 15, which are led up from the ground, pass from below first through the pedestal region 3 and then also through the separating plane to the distribution compartment 4, along with the bottom plate 2. This should produce precisely the seal with respect to the ingress of moisture from below between the pedestal region 3 and the distribution compartment 4 and, for this purpose, seal off the whole of the rest of the horizontal free space on this separating plane around the cables up to the outer frame 7.

For this purpose, the cables 15 should not be removed and it is necessary to take into consideration the fact that the cables 15 are relatively stiff but are not entirely fixed in terms of their position, i.e. are still flexible to a limited extent between the point at which they are clamped at their upper free end in the distribution compartment 4 and the point at which they exit the ground at the lower end of the pedestal region, which makes sealing around these cables 15, particularly over long periods of time, much more difficult since, even merely due to weather-dependent and therefore temperature-dependent material expansions, these cables move their position for example alternately between the summer and winter season or between day and night completely by measurable distances.

Such a bottom plate 2 in the ready-fitted state is illustrated in FIG. 2, but the design can be explained better with reference to the fitting state in FIG. 3.

The bottom plate 2 is split approximately in the center in the longitudinal direction 10, the greater direction of extent in the plan view of the cable distribution cabinet KVS. The rectangular opening 9 in the bottom plate 2, which opening takes up the entire central region and through which the cables 15 are intended to pass, is surrounded on all sides by the bottom plate 2 if the two plate parts 2a, b thereof are positioned opposite one another on the separating line 10', as illustrated in FIG. 2.

In the fitted state, the opening 9 is completely filled with cable sealing blocks 5, in which cable passages 12 can be opened through which, if required, in each case one cable 15 is guided, with the result that the inner circumference of the cable passage 12 of a sealing block 5 bears tightly against the outer circumference of the cable 15 (not illustrated).

The bottom plate 2 is generally a sheet-metal part. In order that the fitter, who works from the front side, as is shown in FIG. 1a, once the doors on the cabinet have been opened, can dismantle and then refit the bottom plate 2, for example, because the complete housing 6 needs to be replaced owing to damage, for example, primarily only the pedestal region 3 is available for this purpose for said fitter to work with the bottom plate 2, which pedestal region 3 is substantially empty apart from the cables 15 passed through.

The distribution compartment 4 located above this, on the other hand, is in practice partially filled with a fitting rack, in contrast to the illustration in FIG. 1b, with a large number of electrical devices being built on said fitting rack, which devices largely fill this space.

For this reason, the rear plate part 2a of the bottom plate 2, which rear plate part 2a faces away from the fitter, is designed so as to be capable of being folded by means of a hinge 16, which runs along the rear longitudinal edge, and can be folded downwards into the pedestal region 3 from the horizontal fitting position. In addition, the plate part 2a can also be removed entirely from the frame 7, either by virtue of the hinge 16 being a separable hinge or by virtue of the hinge 16 being located within the plate part 2a and the plate part 2a being screwed on the frame 7, in particular that part of the hinge 16 which is associated with the frame 7.

The front plate part 2b facing the fitter is preferably not fastened in foldable fashion on the frame 7, but can instead be raised into the fitting position from below, i.e. from the pedestal region 3, as illustrated in FIG. 1b, and connected there to the horizontal struts 7a of the frame 7.

The fixing on the frame 7 takes place in the case of both plate parts 2a, b by means of the toggle closures 24 illustrated in FIGS. 2 and 3, in the case of which toggle closures a radially protruding tab engages in a corresponding groove in the inside of the profiles, which form the frame 7, in a form-fitting manner as a result of the rotation of the pin.

The plate parts 2a, b are sealed off with respect to one another and also with respect to the frame preferably by means of an interposed seal.

For fitting purposes, first the rear plate part 2a is folded up into its horizontal position and fixed there and then the front plate part 2b is raised out of the pedestal region 3 into the fitting position and likewise fixed on the frame 7, i.e. the horizontal struts 7a thereof. However, before this the sealing blocks 5 need to be at least partially fitted.

In order that the sealing blocks 5 do not slide along the cable running direction, they are fixed in their position in a form-fitting manner with respect to the plate parts 2a, 2b by virtue of them being pushed onto guide bars 14, which protrude forwards from the longitudinal edge 9a of the opening 9 in the rear, foldable plate part 2a in the plate plane, i.e. running in the transverse direction 11 into the opening 9, and not only beyond the separating line 10' between the plate parts 2a, 2b, but also beyond the opposite longitudinal edge 9a of the front plate part 2b.

In the illustration in FIG. 3, the guide bars 14, which are arranged at uniform intervals along the longitudinal edge 9a, are always illustrated on the lateral contact line between two sealing blocks 5, but they will preferably run within the sealing blocks 5, for example in each case slightly set back from the outer lateral edge of a sealing block into the interior since the guide bars should not cross the cable passages 12, which are provided in the sealing blocks 5.

The sealing blocks which are made from a foamed plastic, in particular a closed-cell foamed plastic, are furthermore split in the longitudinal direction 10 into in each case two block parts 5a, b; otherwise they can have a different configuration in terms of the way in which they are split.

First, the separating line 5' between the block parts 5a, b can run in linear or nonlinear fashion, but preferably one of the block parts, for example 5a', has projections which engage in corresponding cutouts of the other block part, with the result that these hollows interrupt a straight separating line 5'.

Preferably, however, a zig-zagged separating line 5', as illustrated on the block parts 5a, b, is selected which causes mutual centering of the block parts when they are pressed together in the transverse direction 11.

In addition, the cable passages 12 can be arranged directly on the separating line 5', as illustrated in the blocks 5' and 5", or to one side of the separating line in each case wholly in one of the block parts 5a, b, or both in one sealing block, as illustrated using the block 5'''a, b.

At least the block part 5a, 5'a, 5"a . . . of the split blocks is pushed onto the guide bars 14 before the plate part 2a is folded up into the horizontal position. During the folding-up process, the required already open cable passages 12 in the plugged-on block parts 5a, 5'a, . . . are then laid around the cable circumferences.

Then, the block parts 5b, 5'b, 5"b which are further removed from the rear foldable plate part 2a are plugged onto the guide bars and pushed against the first block parts 5a, 5'a, 5"a . . . and positioned thereon and in the process likewise laid around the corresponding cables with their required, already open cable passages 12.

Then, the front plate part 2b is inserted from the bottom and fixed on the frame 7 at the height of the struts 7a. In order for this to be possible, in this case the size of the opening 9 in the transverse direction 11 is slightly larger than the width of the sealing blocks 5. As a result, however, no reliable sealing between the sealing blocks 5 and the bottom plate 2 is as yet provided.

In order to achieve this, a press strip 19, which runs in the longitudinal direction 10 over the entire length of the opening 9 and has an angled shape with a vertical and a horizontal limb in cross section, possibly also has a second horizontal limb, is then pressed against the front edges of the sealing blocks 5.

This is achieved by virtue of the fact that the vertical limb of the sealing strip 19 has through-openings for the free ends of the guide bars 14 and a thread (not illustrated) is provided on these free ends.

Once the free ends have been pushed through the press strip 19, threaded closures 20, in particular quick-release closures, are screwed onto the thread of the guide bars 14 and, as a result, the press strip 19 is pressed against the sealing blocks 5.

The press strip 19 is fastened displaceably in the transverse direction 11 with respect to the plate part 2b by virtue of the fact that pins protruding from the plate plane of the plate part 2b engage in longitudinal slots in the press strip 19 running in the transverse direction.

Figure 4A:
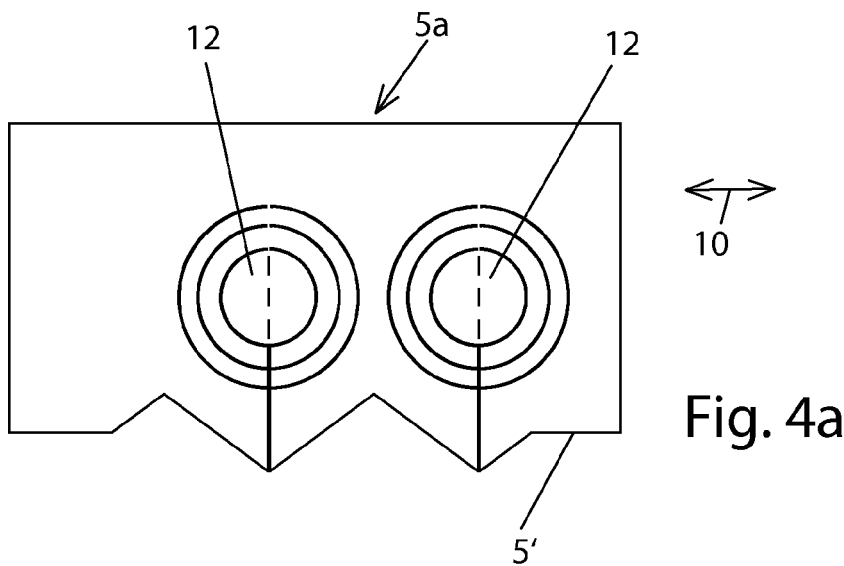
FIG. 4 shows sealing blocks in detail views.
Figure 4B:
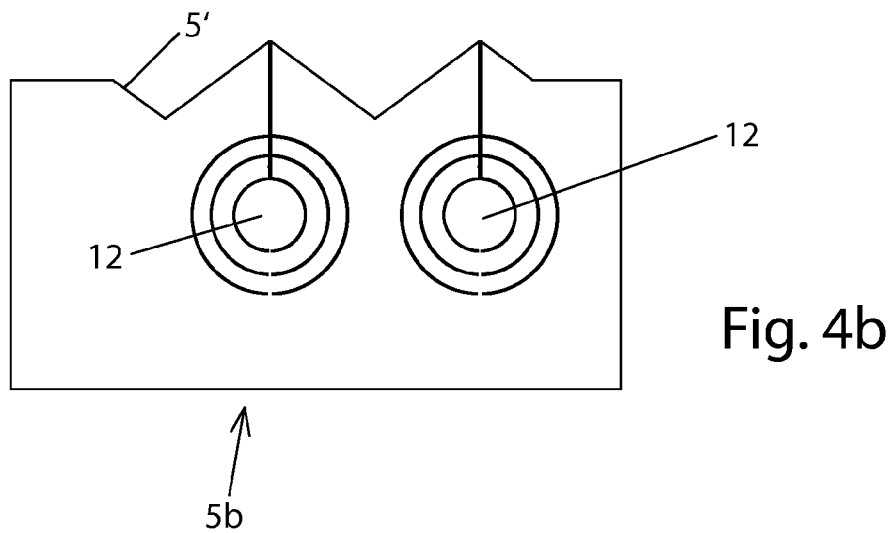
Figure 4C:
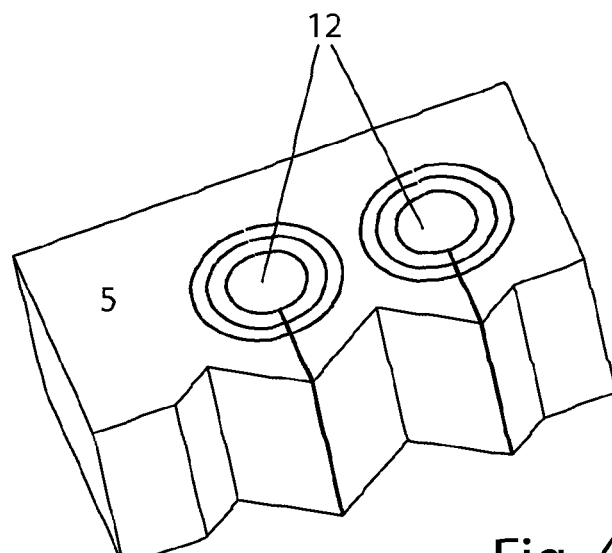
Figure 4D:
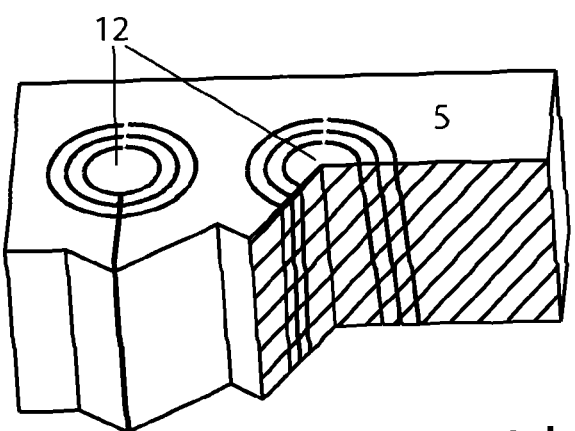
Figure 5:
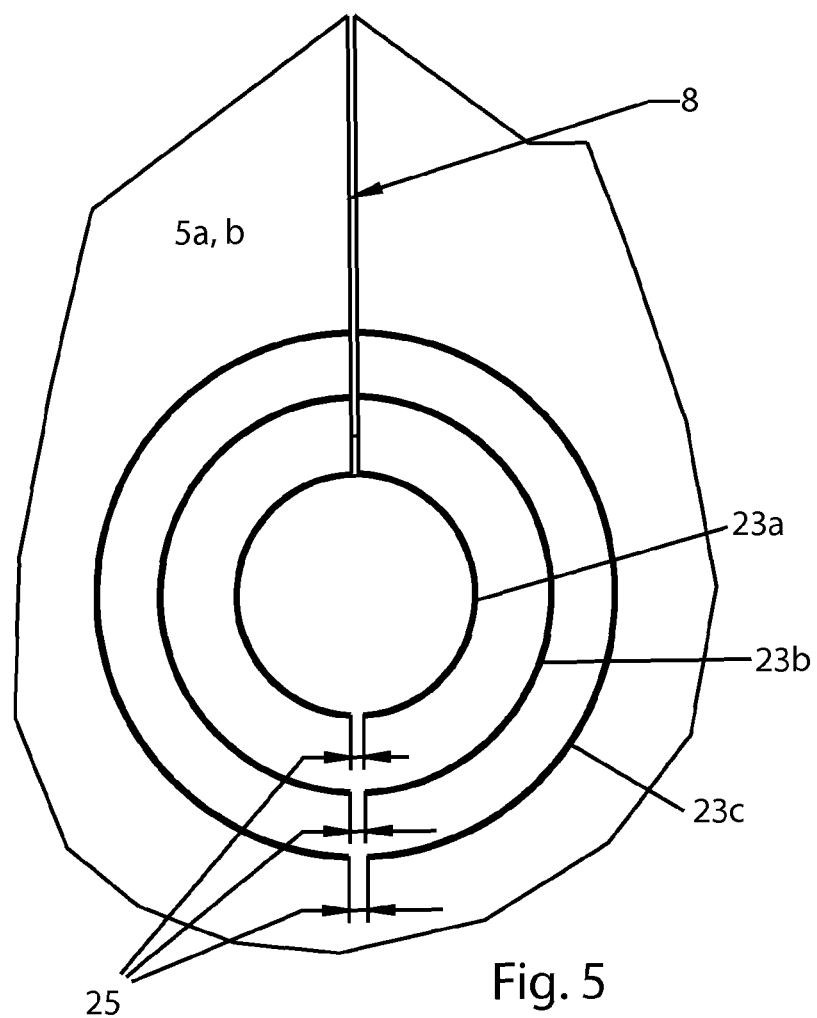
FIG. 5 shows the profile of the cut in the sealing blocks.

FIGS. 4 and 5 shows a sealing block 5 in detail.

First, FIG. 5 shows the fact that the prefabricated cable passages 12 comprise ring-shaped cuts 23a, b, c, which are not completely closed to form a ring, of different diameters, which ring cuts lie concentrically with respect to one another, with the result that the corresponding core part can be removed, depending on the diameter of the cable to be sealed, once the holding web 25 remaining opposite the sealing block has been severed manually.

In order to be able to introduce the cable, an access cut 8 reaches from the outer edge of the sealing block 5 beyond the outer ring-shaped cuts 23*b, c* as far as the innermost ring-shaped cut 23*a*.

The holding webs 25 in the individual ring-shaped cuts are preferably provided on that side in the ring-shaped cut 23*a, b, c* which is opposite the access cut 8.

The good sealing effect results inter alia from the fact that the sealing blocks 5 have a height of several centimeters and therefore a long sealing length with respect to the cable outer diameter.

In order to further improve this, the ring-shaped cuts 23 and the access cut 8 extend not only over the entire height, i.e. the thickness, of the sealing block 5, as is illustrated primarily in FIGS. 4*b* and 4*e*, but the circular ring-shaped cuts 23 do not form a cylindrical shape, but a conical shape, by virtue of the fact that they are inclined with respect to the vertical mid-axis of the cable passage 12 through a cone angle of a few degrees.

In order that the block parts 5*a* and *b* do not slide with respect to one another in the longitudinal direction 10 when they are pressed together, their separating line 5' preferably has a zig-zag configuration, the access cut 8 and also the center of the cable passages 12 preferably being at the height of in each case one tip, in particular the outwardly pointing tip, of a block part 5*a, b*.

This also makes it possible to achieve a situation in which the two block parts 5*a, b* have an identical configuration, with the result that only one type of block parts needs to be kept in stock.

LIST OF REFERENCE SYMBOLS

KVS Cable distribution cabinet
1 Switchgear cabinet
2 Bottom plate
2*a, b* Plate part
3 Pedestal region
4 Distribution compartment
5 Cable sealing block
5*a, b* Block part
5' Separating line
6 Housing
7 Frame
7*a* Transverse strut
8 Access cut
9 Opening
9*a* Longitudinal edge
10 Longitudinal direction of the plan view
10' Separating line
11 Transverse direction of the plan view
12 Cable passage
13
14 Guide bar
14' Through opening
15 Cable
16 Hinge
17 Seal
18 Stop face
19 Press strip
20 Threaded closure
21 Door
22 Pedestal cover
23 Ring-shaped cut
24 Toggle closure
25 Holding web

The invention claimed is:

1. A cable distribution cabinet comprising:
a housing including a frame, the housing including a pedestal region arranged beneath a distribution compartment,
a bottom plate separating the pedestal region from the distribution compartment, the bottom plate including at least one plate part and the bottom plate defining a central opening through which cables pass to enter the distribution compartment,
wherein the at least one plate part of the bottom plate is configured to be folded about a longitudinal axis of the plate part relative to the frame.

2. The cable distribution cabinet as claimed in claim 1, comprising:
a plurality of cable sealing elements located in the central opening of the bottom plate.

3. The cable distribution cabinet as claimed in claim 1, wherein the foldable plate part is capable of being folded downwards into the pedestal region.

4. The cable distribution cabinet as claimed in claim 1, wherein the foldable plate part is configured to be dismantled from the frame.

5. The cable distribution cabinet as claimed in claim 1, wherein the plate part includes a hinge for fastening the plate part on the frame, wherein the hinge is either configured to be dismantled from the frame or the hinge is disconnectable from the frame.

6. The cable distribution cabinet as claimed in claim 1, wherein a second plate part is positioned in the housing opposite the foldable plate part, the second plate part being configured to be dismantled from the frame and, in the process, is capable of being moved exclusively into the pedestal region.

7. The cable distribution cabinet as claimed in claim 6, wherein the second plate part is designed so as to be capable of being folded and dismantled in a similar way to the foldable plate part.

8. The cable distribution cabinet as claimed in claim 6, wherein the plate parts are capable of being fixed on the frame in a form-fitting manner by locking elements including, toggle closures.

9. The cable distribution cabinet as claimed in claim 6, wherein the central opening in the bottom plate has two longitudinal edges, which run parallel to one another in a longitudinal direction of the housing.

10. The cable distribution cabinet as claimed in claim 1, further comprising a plate seal that seals off adjoining edges of the plate parts from one another and further comprising a frame seal.

11. The cable distribution cabinet as claimed in claim 9, wherein guide bars protrude from the plate part, the guide bars extending laterally through a plane of the bottom plate.

12. The cable distribution cabinet as claimed in claim 11, wherein the guide bars protrude from one of the longitudinal edges of the central opening and beyond the opposite one of the longitudinal edges of the central opening, each of the longitudinal edges being defined by one of the plate parts.

13. The cable distribution cabinet as claimed in claim 12, wherein the guide bars are arranged at regular intervals along the longitudinal edges of the central opening.

14. The cable distribution cabinet as claimed in claim 1, wherein the bottom plate is made from sheet metal or plastic.

15. The cable distribution cabinet as claimed in claim 1 wherein the pedestal region extends at least partially into the ground.

16. The cable distribution cabinet as claimed in claim 1 wherein the bottom plate is fastened to the frame.

17. The cable distribution cabinet as claimed in claim 2 wherein the cable sealing elements are sealing blocks split into two block parts in the longitudinal direction.

18. The cable distribution cabinet as claimed in claim 17, wherein the separating line between the block parts, when viewed in a top plan view, has projections in a transverse direction and has a zig-zag configuration.

19. The cable distribution cabinet as claimed in claim 18, wherein the zig-zag configuration of the separating line is asymmetrical and is configured in such a way that two identical block parts are produced.

20. The cable distribution cabinet as claimed in claim 17, wherein the sealing blocks, which are dimensioned to have the same length in the longitudinal direction and to have an identical design, are arranged in the central region of the bottom plate in the longitudinal direction.

21. The cable distribution cabinet as claimed in claim 20, wherein the sealing blocks have an overdimension in a transverse direction in comparison with the central region of extent of the bottom plate.

22. The cable distribution cabinet as claimed in claim 2, including cable passages formed in the cable sealing elements wherein each of the cable passages is arranged completely in one block part and wherein each cable passage is connected to the separating line via an access cut.

23. The cable distribution cabinet as claimed in claim 2, including cable passages formed in the cable sealing elements wherein the cable passages are provided as prefabricated ring-shaped cuts in the sealing blocks, wherein the ring-shaped cuts are not completely closed, and wherein holding webs for interrupting the ring-shaped cuts are also provided.

24. The cable distribution cabinet as claimed in claim 23, wherein each cable passage has a plurality of concentric ring-shaped cuts.

25. The cable distribution cabinet as claimed in claim 23, wherein the ring-shaped cuts are in the form of truncated cones and all have the same cone angle.

26. The cable distribution cabinet as claimed in claim 25, wherein the ring-shaped cuts in the form of truncated cones have a smaller diameter on an upper side of the sealing block than at a lower end.

27. The cable distribution cabinet as claimed in claim 25, wherein the cone angle is between 1° and 10°.

28. The cable distribution cabinet as claimed in claim 2, including cable passages formed in the cable sealing elements wherein the sealing blocks, in addition to the cable passages, have through-openings running in a transverse direction, each of the through-openings in the sealing blocks being spaced at an interval and having a diameter that are sufficient to accommodate the guide bars passing therethrough.

29. The cable distribution cabinet as claimed in claim 28, wherein the through-openings are provided at lateral ends of the sealing blocks.

30. The cable distribution cabinet as claimed in claim 28, wherein each of the plate parts defines a longitudinal edge of the central region and each of the plate parts includes a stop face which extends in a vertical direction a stop face height that at least corresponds to a height of the sealing blocks, wherein the guide bars protrude through a center of the stop face height.

31. The cable distribution cabinet as claimed in claim 28, wherein at least one of the plate parts is a non-foldable plate part, wherein each of the plate parts defines a longitudinal edge of the central opening, and wherein the longitudinal edge of the non-foldable plate part is in the form of a press strip, which is displaceable in a transverse direction with respect to the nonfoldable plate part, wherein free ends of the guide bars pass through the press strip and wherein the press strip is pressed against the sealing blocks by threaded closures screwed onto the free ends of the guide bars.

32. The cable distribution cabinet as claimed in claim 2, wherein the cable sealing elements are sealing blocks, the sealing blocks arranged next to one another in a row, and wherein the sealing blocks in the longitudinal direction in the central region have an overdimension in comparison with the length of the central region in the bottom plate.

33. A cable distribution cabinet with a housing, in which a pedestal region is arranged beneath a distribution compartment, the cable distribution cabinet comprising:
a bottom plate that separates the pedestal region from the distribution compartment, the bottom plate defining an opening configured to enable a plurality of cables to pass through in a vertical cable running direction,
a plurality of sealing elements located in the housing, the sealing elements including sealing blocks made from elastic, foamed material in which cable passages are formed, the sealing elements having a sealing length in the vertical cable running direction of more than 30 mm.

34. The cable distribution cabinet as claimed in claim 33, wherein the sealing length is more than 50 mm.

35. The cable distribution cabinet as claimed in claim 34, wherein the sealing length is more than 70 mm.

36. A method for fitting a two-part bottom plate in an opening of a cable distribution cabinet, the opening having a length and being located between a pedestal region and a distribution compartment of the distribution cabinet, at least the distribution compartment including a frame, the method comprising:
fastening a first, foldable plate part on a horizontal transverse strut of the frame,
folding down the first plate part, the first plate part including guide bars;
pushing first sealing block parts onto the guide bars of the folded-down plate part over the entire length of the opening,
folding up the first plate part and, in the process, inserting cables into corresponding cable passages in the first sealing block parts which have already been pushed onto the guide bars,
fixing the folded-up plate part in a horizontal position in comparison with the frame,
pushing, in a transverse direction, second sealing block parts onto the guide bars over the entire length of the opening and, in the process, inserting additional cables into cable passages of the second sealing block parts,
feeding a second plate part through the distribution compartment from below into a plate plane and fixing the second plate part there in relation to the frame,
pushing a press strip with through-openings onto the guide bars, and
applying a threaded closure to a thread at a free end of each guide bar and prestressing the sealing blocks in the transverse direction with the aid of the threaded closures and the press strip.

37. The method as claimed in claim 36, wherein the two-part bottom plate is a new bottom plate, the frame is a new frame, and the method further comprises:
before fitting the new bottom plate to the cabinet,
removing an old bottom plate from the cabinet,
dismantling an old cabinet housing from an old, damaged frame,
lifting the old, damaged frame upwards from the cabinet, and slipping the new frame over onto the cabinet and fitting the new frame on the pedestal region of the cabinet, and fitting a new housing on the new frame once the new bottom plate has been fitted to the cabinet.

38. The method as claimed in claim 36, wherein the two-part bottom plate is a new bottom plate, the frame is a new frame, and the method further comprises:
before the new bottom plate is fitted to the cabinet,
removing an old housing from cabinet internals,
removing an old frame or an old mounting rack from the cabinet internals, wherein the cabinet internals are held by an auxiliary rack,
removing an old pedestal from the cabinet internals,
positioning a new enlarged pedestal around the cabinet internals and cables,
positioning the new frame onto the new pedestal,
fixing the cabinet internals onto the new frame and removing the auxiliary rack,
fitting the new bottom plate in such a way that the new bottom plate is located below an old bottom plate, if such an old bottom plate is present, and
once the new bottom plate has been fitted, fixing a new housing on the new frame.

39. The method as claimed in claim 38, wherein cabinet internals are suspended by the auxiliary rack when the old frame is removed.

40. A bottom plate for a switchgear cabinet, the bottom plate being located between a pedestal region and a distribution compartment of the switchgear cabinet, the bottom plate comprising:
a plurality of cable sealing elements in a central region of the bottom plate, and
a plurality of plate parts with a separating line therebetween, which runs parallel to a longitudinal direction of the switchgear cabinet,
wherein the cable sealing elements are sealing blocks made from elastic, foamed material, with a sealing length in a vertical cable running direction of more than 30 mm, wherein cable passages are formed in the cable sealing elements.

41. The bottom plate as claimed in claim 40, wherein each of the sealing blocks are split into two block parts in the longitudinal direction.

42. The bottom plate as claimed in claim 41, wherein the separating line between the block parts, when viewed in a top plan view, has projections in a transverse direction and has a zig-zag configuration.

43. The bottom plate as claimed in claim 42, wherein the zig-zag configuration of the separating line is asymmetrical and is configured in such a way that two identical block parts are produced.

44. The bottom plate as claimed in claim 41, wherein the sealing blocks, which are dimensioned to have the same length in the longitudinal direction and to have an identical design, are arranged in the central region of the bottom plate in the longitudinal direction.

45. The bottom plate as claimed in claim 44, wherein the sealing blocks have an overdimension in a transverse direction in comparison with the central region of extent of the bottom plate.

46. The bottom plate as claimed in claim 40, wherein the cable passages lie on the separating line with a center of each cable passage located on the separating line.

47. The bottom plate as claimed in claim 40, wherein each of the cable passages is arranged completely in one block part and wherein each cable passage is connected to the separating line via an access cut.

48. The bottom plate as claimed in claim 40, wherein the cable passages are provided as prefabricated ring-shaped cuts in the sealing blocks, wherein the ring-shaped cuts are not completely closed, and wherein holding webs for interrupting the ring-shaped cuts are also provided.

49. The bottom plate as claimed in claim 48, wherein each cable passage has a plurality of concentric ring-shaped cuts.

50. The bottom plate as claimed in claim 48, wherein the ring-shaped cuts are in the form of truncated cones and all have the same cone angle.

51. The bottom plate as claimed in claim 50, wherein the ring-shaped cuts in the form of truncated cones have a smaller diameter on an upper side of the sealing block than at a lower end.

52. The bottom plate as claimed in claim 50, wherein the cone angle is between 1° and 10°.

53. The bottom plate as claimed in claim 50, wherein the cone angle is between 2° and 7°.

54. The bottom plate as claimed in claim 40, wherein the sealing blocks, in addition to the cable passages, have through-openings running in a transverse direction, each of the through-openings in the sealing blocks being spaced at an interval and having a diameter that are sufficient to accommodate the guide bars passing therethrough.

55. The bottom plate as claimed in claim 54, wherein the through-openings are provided at lateral ends of the sealing blocks.

56. The bottom plate as claimed in claim 54, wherein each of the plate parts defines a longitudinal edge of the central region and each of the plate parts includes a stop face which extends in a vertical direction a stop face height that at least corresponds to a height of the sealing blocks, wherein the guide bars protrude through a center of the stop face height.

57. The bottom plate as claimed in claim 54, wherein at least one of the plate parts is a non-foldable plate part, wherein each of the plate parts defines a longitudinal edge of the central opening, and wherein the longitudinal edge of the non-foldable plate part is in the form of a press strip, which is displaceable in a transverse direction with respect to the non-foldable plate part, wherein free ends of the guide bars pass through the press strip and wherein the press strip is pressed against the sealing blocks by threaded closures screwed onto the free ends of the guide bars.

58. The cable distribution cabinet as claimed in claim 40, wherein the cable passages lie on the separating line with a center of each cable passage located on the separating line.

59. The bottom plate as claimed in claim 40, wherein the sealing blocks are arranged next to one another in a row, and wherein the sealing blocks in the longitudinal direction in the central region have an overdimension in comparison with the length of the central region in the bottom plate.

60. The bottom plate as claimed in claim 40, wherein the sealing length is more than 50 mm.

61. The bottom plate as claimed in claim 40, wherein the sealing length is more than 70 mm.

* * * * *